March 26, 1957  H. A. LARSON ET AL  2,786,232
FEEDING MECHANISM
Filed Jan. 28, 1952  2 Sheets-Sheet 1
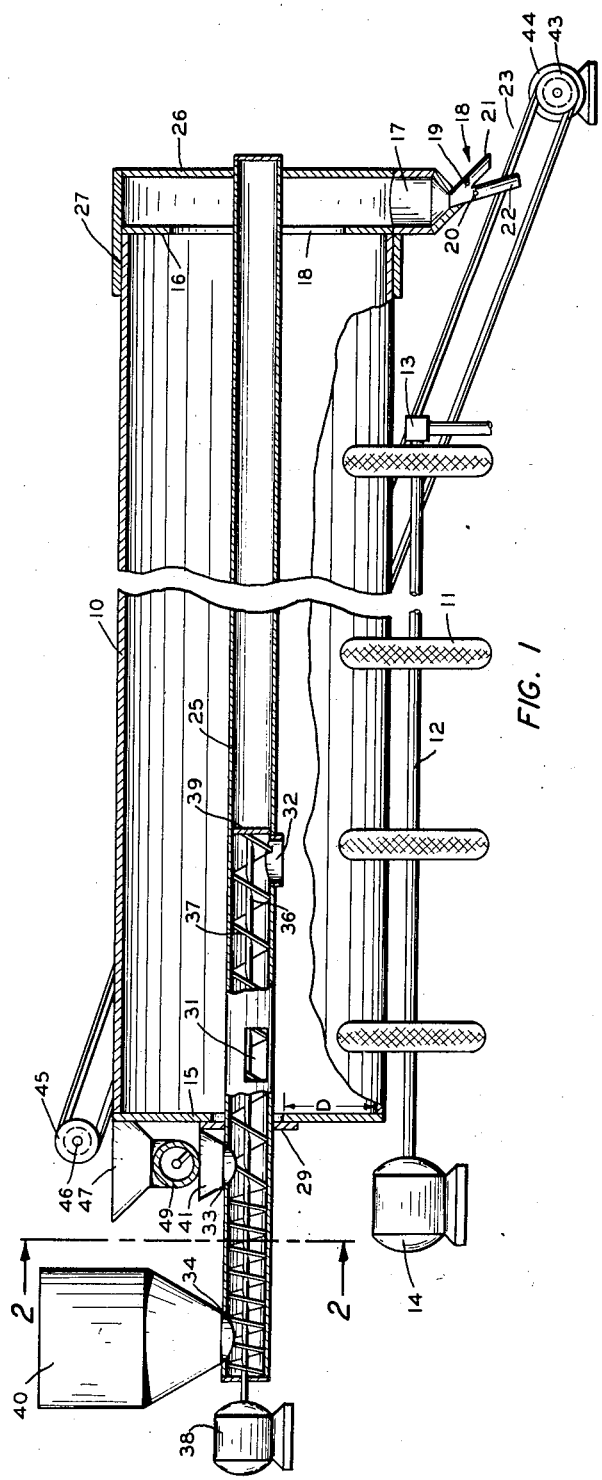
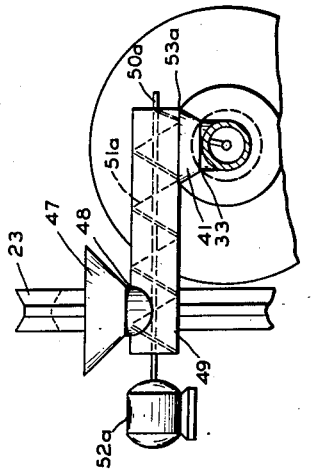
INVENTORS
H. A. LARSON
W. R. KING
BY
Hudson & Young
ATTORNEYS March 26, 1957 H. A. LARSON ET AL 2,786,232
FEEDING MECHANISM
Filed Jan. 28, 1952 2 Sheets-Sheet 2

INVENTORS
H. A. LARSON
W. R. KING
BY
Hudson & Young
ATTORNEYS

United States Patent Office 2,786,232
Patented Mar. 26, 1957

2,786,232

FEEDING MECHANISM

Harold A. Larson, Borger, Tex., and William R. King, Bartlesville, Okla., assignors to Phillips Petroleum Company, a corporation of Delaware Application January 28, 1952, Serial No. 268,644

8 Claims. (Cl. 18—1)

This invention relates to mechanism for feeding granular material. In another aspect, it relates to a process for pelleting carbon black.

Carbon black is produced in the furnace process by the incomplete combustion of carbonaceous material, such as a heavy gas oil, the carbon black being separated from the combustion gases after the reaction is completed. As it comes from the separation device, the carbon black is in a fluffy flocculent condition, and has a bulk density of approximately four pounds per cubic foot. In this condition, the black is extremely difficult to handle or package, and the bulk of the package required for holding a given weight of black is too great to permit economical shipment. Accordingly, before shipping or handling, the carbon black is subjected to a treatment whereby its density is increased.

A commercially successful and extremely satisfactory treatment of this type is the formation of the flocculent carbon black into relatively hard dense pellets. Such pellets may have a bulk density of as high as twenty-five to thirty pounds per cubic foot, as compared to approximately four pounds per cubic foot for the flocculent black. Therefore, in the form of pellets, the bulk of a package required for holding a given weight of black is substantially decreased. Further, due to the aggregation of the flocculent particles, there is little dust formation when the carbon black pellets are handled. Dust formation is a serious and annoying problem when an attempt is made to handle or package the carbon black in its flocculent condition.

One very satisfactory method of forming pellets of carbon black is to introduce the material into a rotating cylindrical mill wherein there is a gentle "cascading" or rolling and tumbling action as the carbon black particles elevated by rotation of the mill roll and tumble transversely across the sloping surface of the bed in the mill. The resulting carbon black pellets are removed from the outlet end of the mill for packaging or shipment in tank cars. In most cases it is advantageous, and in some cases it is essential that a portion of the product pellets be recycled to the inlet end of the mill. Although the exact mechanism of the action of the recycled pellets is not known, it is believed that they are broken up in the mill into smaller sizes and serve as nuclei for the formation of larger pellets from the flocculent black charge to the mill.

In many cases, it has been found desirable to introduce the flocculent black to the mill at a plurality of points spaced longitudinally within the pellet mill. This has been done by the use of a plurality of screw conveyors each extending a different distance into the pellet mill. A disadvantage of this type of structure is that the opening at the inlet end of the mill must, in this case, be sufficiently large as to accommodate the plurality of screw conveyors. This creates a rather difficult sealing problem at the inlet end of the mill and prevents the bed depth in the mill from exceeding the radial distance from the outer circumference of the mill to the outer edge of the opening. In other cases, it has been proposed to utilize a single screw in such conveyors, a plurality of longitudinally spaced openings being provided in the tube surrounding the conveyor, each opening being in the bottom part of the tube. Difficulties have been experienced with this type of conveyor mechanism resulting from clogging of the openings by masses of flocculent carbon black.

It is a major purpose of this invention to provide a structure wherein the black is fed to the mill through a single conveyor and distributed at various longitudinally spaced zones within the mill with elimination of difficulties resulting from clogging.

Further, where recycle pellets are utilized, it has previously been customary to introduce the pellets and flocculent black through separate feeding mechanism located at the inlet end of the mill. One or a plurality of screw conveyors were utilized to feed the flocculent black into the mill while the recycle pellets were passed through a separate pipe or conveyor extending through the inlet end of the mill. We have found it to be highly advantageous to mix together the recycle pellets and flocculent black, the mixture being introduced into the mill through a single conveyor device, which may distribute the mixture of flocculent black and pellets either at one or a plurality of longitudinally spaced regions within the mill. To this end we have devised a feeding mechanism for cooperation with a pellet mill and its recycling device.

In another embodiment of the invention, we have found desirable results to be obtained by providing a single tube extending through the mill and enclosing two screw conveyors of opposite pitch. Recycle pellets are introduced to one conveyor and pass through the inlet end of the mill to a region a short distance beyond the inlet. The flocculent black is fed through the outlet end of the mill in a second conveyor to a region closely spaced to the region of introduction of the recycle pellets. In this manner, separate introduction of the flocculent black and recycle pellets is obtained with the use of only one screw conveyor tube. In this modification, if desired, the flocculent black may be distributed at a plurality of longitudinally spaced regions within the mill.

Although we have referred hereinbefore to a process for pelleting carbon black, it will be understood that the various types of feeding mechanism coming within the scope of the invention have independent utility in other applications, particularly in the transportation of granular material.

It is an object of the invention to provide improved mechanism for feeding and distributing granular material.

It is a further object to provide an improved process and apparatus for the pelleting of carbon black.

It is a still further object to provide such a process and apparatus at a low cost, and to permit the use of a higher bed depth in a pellet mill.

Various other objects, advantages and features of the invention will become apparent from the following detailed description taken in conjunction with the accompanying drawings, in which:

Figure 1 is a vertical sectional view, partially in elevation, of a carbon black pelleting mill utilizing the feeding mechanism of our invention;

Figure 2 is a sectional view, partially broken away, taken along the lines 2—2 of Figure 1, looking in the direction of the arrows.

Figure 3:
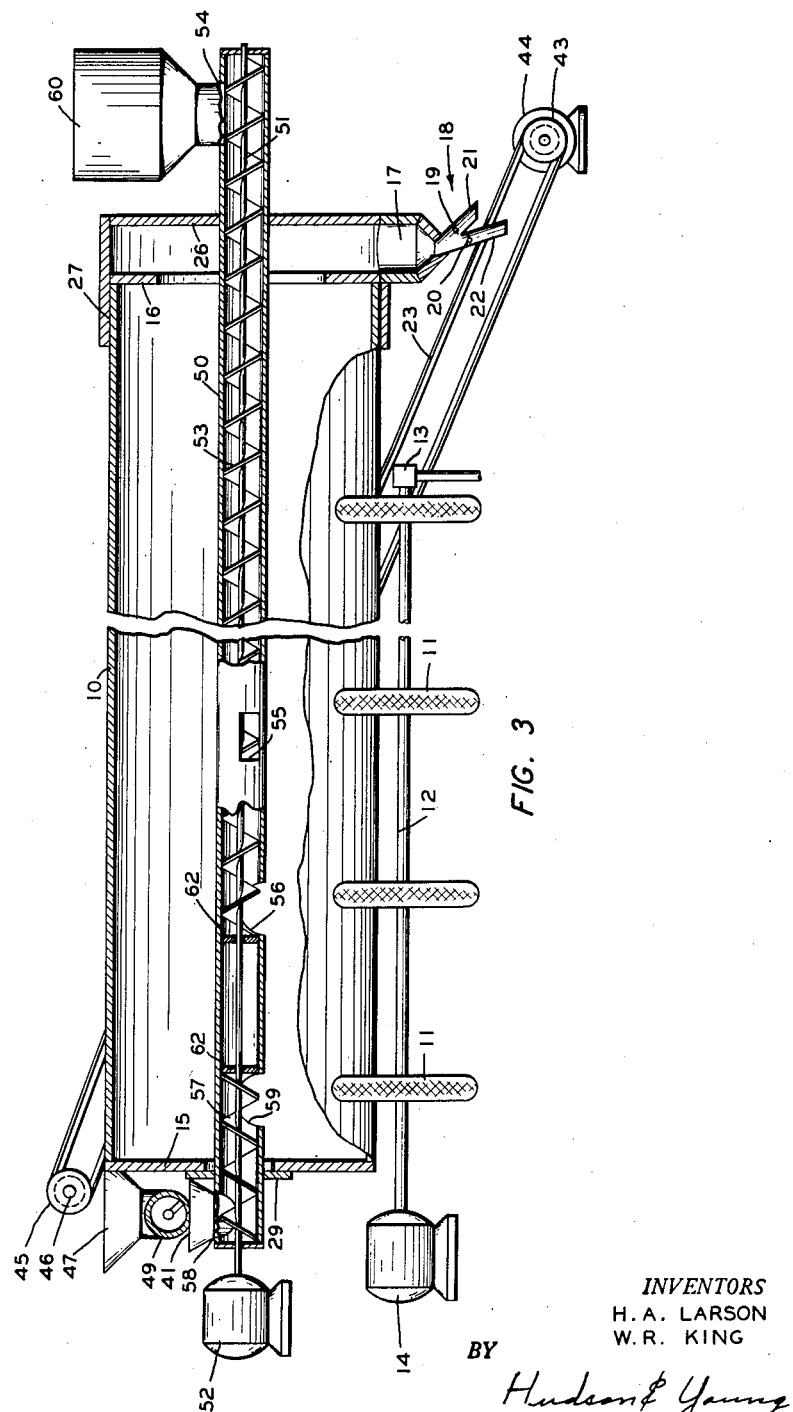
Figure 3 is a vertical sectional view, partially in elevation, of a modified pellet mill utilizing the feeding mechanism of our invention.

Referring now to the drawings in detail and particularly to Figures 1 and 2, a horizontally disposed generally cylindrical pellet mill 10 is supported by two sets of rubber tires, one of which is shown at 11, these tires being mounted upon a shaft 12 journaled in a support 13 and driven by a motor 14. When motor 14 is operated, the frictional engagement of the tires 11 with the pellet mill 10 causes the mill to rotate responsive to rotation of the tires. The mill 10 is provided with an annular plate 15 at its inlet end and with an annular plate 16 at its outlet end. When flocculent carbon black is introduced into the inlet end of the mill, carbon black pellets are formed by the "cascading" or rolling and tumbling action of the particles caused by rotation of the mill. The pellets so formed are discharged through the opening in end plate 16 into a chamber 17. It will be understood that the size of the opening 18 in plate 16 regulates the bed depth in the mill, the plate forming, in effect, a wier or dam over which the pellets are discharged into the chamber 17. From the chamber 17, the pellets flow to a proportioning device 18 which divides the withdrawn pellets into a recycle and a product portion, the distribution between which is controlled by dampers 19, 20 in outlet conduits 21 and 22, respectively. The product pellets flowing through conduit 22 are packaged in sacks or transported to tank cars for shipment while the recycle pellets from conduit 21 are discharged upon an endless belt 23 to be hereinafter described in more detail.

Extending axially through the mill 10 is an elongated stationary tube 25 which is mounted upon suitable supports, not shown, outside the pellet mill. The stationary tube 25, in turn, supports a housing 26 defining the chamber 17 so that there is a bearing surface 27 between the stationary housing 26 and rotatable mill 10. The tube 25 can also carry stationary scrapers, not shown, to remove deposits of carbon black from the sides of the mill. It will be noted that, at the inlet end of the mill, an annular sealing member 29 is provided which is carried by the end plate 15 and rubs against the stationary tube 25. As will be hereinafter explained, all material fed to the mill passes through the tube 25 so that the central opening in annular plate 15 need only be sufficiently large as to accommodate the tube 25 without rubbing or engagement between the tube and plate. This greatly simplifies the sealing problem as the bed depth can be as great as the radial distance D between the outer surface of the mill and the outer edge of the opening in plate 15 without any tendency for the material within the mill to flow through this opening, which tendency would greatly increase the sealing problem. Furthermore, if a plurality of conveyors were utilized or if separate feeding conduits were employed for the flocculent black and recycle material it would be necessary to increase the size of the opening in plate 15 to accommodate the extra tubes or conduits. This, in turn, would decrease the distance D and, hence, the allowable bed depth permitted without involving a serious sealing problem at the inlet end of the mill.

The tube 25 is provided with a pair of longitudinally spaced discharge openings 31 and 32 inside the mill together with a pair of longitudinally spaced feed openings 33, 34 outside the mill. The inner opening 32 is preferably and advantageously located in the bottom portion of the tube while the opening 31 is angularly spaced from the bottom portion of the tube. That is, opening 31 is located in the side wall of the tube. In a preferred embodiment of the invention, where the mill 10 is forty-eight feet long, the opening 32 can be positioned five feet from the inlet end of the mill and the opening 31 can be positioned eighteen inches from the inlet end of the mill. If desired, more than two discharge openings can be provided. Where this is done, the innermost discharge opening is positioned at the bottom of the tube while all preceding discharge openings are positioned in the side wall of the tube.

In accordance with the invention, an axial shaft 36 is suitably journaled within the tube 25, this tube carrying a helical metal plate 37 forming a screw conveyor. It will be understood that the word "tube," as used herein, comprehends a trough or other similar structure for guiding the material to be conveyed. The shaft 36 is driven by a motor 38 and it is provided with a disk 39 just downstream from the innermost feed opening 32, this disk being closely spaced to the walls of the tube so as to prevent passage of any material beyond the opening 32.

Flocculent carbon black is continuously introduced into the screw conveyor 37 from a hopper 40 cooperating with feed opening 34. Recycle pellets from the outlet end of the mill are introduced into a hopper 41 cooperating with feed opening 33 in the manner now to be described. As previously stated, pellets from the outlet end of the mill pass through chamber 17 and proportioning device 18 to the endless belt 23. This belt is carried between a pulley 43 driven by a motor 44 and a pulley 45 suitably journaled at 46 upon a support, not shown. The belt is inclined and is located at the side of the pellet mill, the direction of belt rotation being such that the recycle pellets falling upon the belt are carried upwardly thereby from the outlet end to the inlet end of the mill and discharged into a hopper 47 which communicates with a feed opening 48 in a tube 49. A shaft 50a carrying a screw conveyor 51a and driven by a motor 52a conveys the recycle pellets laterally from the feed opening 48 to a discharge opening 53a communicating with the hopper 41 and feed openings 33 of the tube 25.

It will be evident that recycle pellets and flocculent black are fed to the conveyor 37 and mixed therein, the mixture being discharged into the mill through the openings 31 and 32. It will be noted that the pitch of the conveyor, that is, the distance along tube 25 required for the conveyor blade to make a complete revolution of 360°, is substantially less at the region between feed openings 33, 34 than the pitch of the conveyor between feed opening 33 and discharge openings 31, 32. In practice, the pitch between said openings 33, 34 may be one-half the pitch between the feed opening 33 and the discharge openings 31, 32. This is explicable on the basis that the flocculent carbon black enters the conveyor through opening 34 by the force of gravity and, therefore, completely fills the space within the tube as it is transported toward the discharge openings. When the recycle pellets are introduced through opening 33, the pitch of the conveyor screw is increased so that there is ample room between successive flights of the conveyor to permit the introduction of the recycle pellets and the intimate mixture thereof with the flocculent carbon black. In practice, such mixture has been found highly advantageous with regard to bed stability in the pellet mill and uniformity of product.

As shown, the mixture of flocculent black and pellets is fed to the mill through both of the discharge openings 31, 32. The sizes of these openings are so proportioned that approximately one-half the feed enters the mill through each opening. Calculations of the proper size for the opening are not too reliable and proper sizes are ordinarily determined by empirical methods. In one commercial mill, where the tube 25 is of nine inch diameter, an opening 31 three inches wide and eight inches long was found to divert approximately one-half the feed to the mill. It is quite important that the opening 31 be positioned in the side wall of the tube and not in the bottom portion thereof. Where this opening is located in the bottom portion of the tube, considerable difficulties arise from clogging, and it is extremely hard to obtain a proper and uniform distribution of the feed between the two discharge openings. Preferably, the upper edge of the opening is in the horizontal plane of the shaft 36.

It will be understood that no recycling is required in the formation of pellets from certain particular types of flocculent carbon black. In this case, only flocculent black is fed to the conveyor through hopper 40 and the feed opening 33 is eliminated. In such case, the screw conveyor can, of course, have the same pitch throughout its length. Further, the introduction of flocculent black through the angularly spaced discharge openings 31, 32 provides improved results even when the recycle pellets are introduced in some manner other than through feed openings 33, although improved results are produced as to uniformity of operation when the feed and recycle pellets are introduced and mixed within the tube 25. It will be further understood that the feeding mechanism described herein in connection with a carbon black pelleting unit has independent utility in other industrial applications.

In Figure 3, we have shown a carbon black pelleting mill utilizing a modified feeding mechanism. The structure of the mill, its driving means, and the apparatus for recycling the pellets are generally similar to those of Figures 1 and 2 and will not be further described in detail, corresponding parts being indicated by like reference numerals. In this modification, a non-rotatable tube 50 is carried by suitable supports, not shown, and extends axially through the mill 10. Journaled in the tube 50 is an axial shaft 51 driven by a motor 52. Mounted upon the shaft 51 is a helical metal plate 53 forming a screw conveyor, the plate being of the proper pitch to convey granular material, such as carbon black, from a feed opening 54 located outside and adjacent the outlet end of the mill to a pair of discharge openings 55 and 56. Also mounted upon the shaft 51 is a helical metal plate 57 which forms a screw conveyor of reverse pitch to move granular material from a feed opening 58 outside and adjacent the inlet end of the mill to a discharge opening 59 inside and adjacent the inlet end of the mill.

Flocculent carbon black is fed from a hopper 60 through the feed opening 54 and conveyor 53 to the discharge openings 55, 56 in the mill. Pellets leaving the mill are divided into a product portion and a recycle portion by the proportioning device 18, the recycle portion being carried by belt 23 to hopper 47 from which it passes through conveyor 51a, Figure 2, to the hopper 41 and feed opening 58, Figure 3. The recycle pellets are carried inwardly by the conveyor 57 and discharged into the mill through the opening 59. It will be noted that the shaft 51 extends through plates 62 which are closely spaced or welded to the respective openings 56, 59 and serve to separate the two conveyor sections carried by the shaft 51. In this manner, the flocculent black and recycle pellets are separately introduced into the mill by the use of only one tube 50 passing through the inlet and outlet ends of the mill. In this manner, the desired bed depth can be maintained without creating a sealing problem at the inlet end of the mill and a very compact and efficient arrangement is provided.

In a forty-eight foot mill, discharge opening 59 is approximately eighteen inches from the inlet end of the mill, discharge opening 56 is approximately five feet from the inlet end of the mill and discharge opening 55 is approximately ten feet from the inlet end of the mill. In this manner, the recycle pellets are "cascaded" for a short interval before the flocculent black is added thereto which has been found to be desirable in many types of operation.

Depending upon particular types of material to be pelleted and other operating conditions, one or more than two discharge openings can be used in connection with conveyor section 53 and one or more discharge openings can be used in connection with conveyor section 57. However, where more than one discharge opening is utilized, it is important that all such openings, except the innermost one, be angularly spaced from the bottom portion of the tube 50. That is, such discharge openings should be positioned in the side wall of the tube, as is discharge opening 55, to prevent difficulties arising from clogging of the openings by the carbon black particles. The conveyor system is quite flexible and requires little maintenance since both sections of the conveyor are positioned upon a single shaft and enclosed within a single tube, which tube is ordinarily provided in pellet mills to form a support for a stationary scraper device, not shown. Finally, the feeding mechanism of our invention permits the use of a greater bed depth without troublesome sealing problems, thereby improving the stability of operation of the mill and the uniformity in size and hardness of the product pellets.

While the invention has been described in connection with present, preferred embodiments thereof, it is to be understood that this description is illustrative only and is not intended to limit the invention.

We claim:

1. In apparatus for pelleting carbon black, in combination, a cylindrical mill, means for rotating said mill, a tube extending longitudinally within said mill, said tube having a pair of spaced discharge openings inside said mill and a feed opening outside said mill, the discharge opening remote from said feed opening being positioned at the bottom of said tube and the discharge opening adjacent said feed opening being angularly offset from the bottom portion of said tube, means for feeding flocculent carbon black to said feed opening, a screw conveyor within said tube to carry material from said feed opening to both discharge openings, and means for rotating said screw conveyor whereby flocculent carbon black can be evenly discharged and clogging of the discharge openings is minimized.

2. Apparatus in accordance with claim 1 wherein the sizes of the discharge openings are so proportioned that approximately one-half of the flocculent carbon black enters the mill at each discharge opening.

3. In apparatus for pelleting carbon black, in combination, a cylindrical mill, means for rotating said mill, a non-rotatable tube extending longitudinally within said mill, said tube having a pair of spaced discharge openings inside said mill and a feed opening outside said mill, the discharge opening remote from said feed opening being positioned at the bottom of said tube and the discharge opening adjacent said feed opening being angularly offset from the bottom portion of said tube, means for feeding flocculent carbon black to said feed opening, a screw conveyor within said tube to carry material from said feed opening to both discharge openings, means for rotating said screw conveyor, a second feed opening in said tube outside said mill, means for withdrawing pellets of carbon black from said mill, and means for feeding a portion of the withdrawn pellets to said second feed opening.

4. In apparatus for pelleting carbon black, in combination, a generally cylindrical pellet mill disposed in a horizontal position, a non-rotatable tube extending axially into said pellet mill, means for sealing the region between said tube and said mill, said tube having a discharge opening positioned inside said mill and a pair of longitudinally spaced feed openings positioned outside said mill, means for feeding flocculent carbon black to the feed opening remote from said discharge opening, means for withdrawing pellets of carbon black from said mill, means for conveying a portion of the withdrawn pellets to the other feed opening, a screw conveyor for carrying material from both feed openings to said discharge opening, the pitch of said conveyor being substantially smaller between said feed openings than the pitch of the remaining portion of the conveyor, and means for rotating said conveyor.

5. In apparatus for pelleting carbon black, in combination, a generally cylindrical pellet mill disposed in a horizontal position, a non-rotatable tube extending axially into said pellet mill, means for sealing the region between said tube and said mill, said tube having a discharge opening positioned inside said mill and a pair of longitudinally spaced feed openings positioned outside said mill, means for feeding flocculent carbon black to the feed opening remote from said discharge opening, means for withdrawing pellets of carbon black from said mill, means for conveying a portion of the withdrawn pellets to the other feed openings, said conveying means including a proportioning device for dividing said pellets into a product portion and a recycle portion, an endless belt at the side of the mill extending upwardly from said proportioning device to a position adjacent and at a higher level than said feed openings, means for feeding said recycle pellets onto said belt, a hopper for receiving pellets discharged by said belt, a screw conveyor having a feed opening communicating with said hopper and a discharge opening, a second hopper positioned below said last-mentioned discharge opening and communicating with the other feed opening in said tube, and a screw conveyor in said tube for carrying material from said feed openings to said discharge opening.

6. In apparatus for pelleting carbon black, in combination, a generally cylindrical pellet mill disposed in a horizontal position, a non-rotatable tube extending axially into said pellet mill, means for sealing the region between said tube and said mill, said tube having a pair of spaced discharge openings positioned inside said mill which are angularly offset with respect to each other, and a pair of longitudinally spaced feed openings positioned outside said mill, means for feeding flocculent carbon black to the feed opening remote from said discharge opening, means for withdrawing pellets of carbon black from said mill, means for conveying a portion of the withdrawn pellets to the other feed opening, said conveying means including a proportioning device for dividing said pellets into a product portion and a recycle portion, an endless belt at the side of the mill extending upwardly from said proportioning device to a position adjacent and at a higher level than said feed openings, means for feeding said recycle pellets to said belt, a hopper for receiving pellets discharged by said belt, a screw conveyor having a feed opening communicating with said hopper and a discharge opening, a second hopper positioned below said last-mentioned discharge opening and communicating with the other feed opening of said tube, and a screw conveyor in said tube for carrying material from both feed openings to both discharge openings therein.

7. In apparatus for pelleting carbon black, in combination, a mill having a cylindrical body portion, end plates cooperating with said body portion to define the respective ends of said mill, a tube mounted axially with respect to said mill, said tube being secured to one of said end plates and extending through the other of said end plates, there being an opening in said other end plate of slightly greater size than said tube through which said tube extends, means for sealing the region between said tube and said other end plate, said tube having a feed opening outside said mill and a pair of longitudinally spaced discharge openings within said mill, the discharge opening remote from said feed opening being positioned at the bottom of said tube and the discharge opening adjacent said feed opening being angularly offset from the bottom portion of said tube, a screw conveyor in said tube for conveying carbon black from said feed opening to both discharge openings, and means for rotating said screw conveyor.

8. The method of pelleting carbon black which comprises feeding flocculent carbon black along a helical path of relatively small pitch, feeding the flocculent black from the end of said path along a helical path of relatively large pitch wherein the black is spread out, introducing carbon black pellets at the upstream end of said path of relatively large pitch whereby the pellets are intimately mixed with the flocculent black, discharging said mixture onto a bed of carbon black pellets, continuously elevating one side of the bed to cause a rolling and tumbling action of the elevated pellets along the resulting inclined surface of the bed, whereby the flocculent black in said mixture is formed into pellets, and recovering the resulting carbon black pellets.

References Cited in the file of this patent

UNITED STATES PATENTS

| Re. 6,672 | Regan | Oct. 5, 1875 |
| 302,501 | Kruse | July 22, 1884 |
| 311,052 | Anderson | Jan. 20, 1885 |
| 2,015,954 | Mitchell | Oct. 1, 1935 |
| 2,164,164 | Price | June 27, 1939 |
| 2,504,787 | Bailey | Apr. 18, 1950 |
| 2,571,637 | Weist | Oct. 16, 1951 |
| 2,638,625 | Studebaker et al. | May 19, 1953 |

FOREIGN PATENTS

| 103,571 | Switzerland | Feb. 16, 1924 |
| 629,844 | Germany | May 14, 1936 |
| 638,863 | Great Britain | June 14, 1950 |